United States Patent Office 3,336,262
Patented Aug. 15, 1967

3,336,262
BRANCHED CHAIN POLYOXYMETHYLENE
POLYCARBOXYLATES
Henri Sidi, Paramus, N.J., assignor to Tenneco
Chemicals, Inc., a corporation of Delaware
No Drawing. Filed Nov. 5, 1965, Ser. No. 506,612
The portion of the term of the patent subsequent to
Nov. 23, 1982, has been dedicated to the Public
7 Claims. (Cl. 260—67)

This application is a continuation-in-part of my copending application Ser. No. 133,783, filed Aug. 25, 1961, entitled, "Production of Branched Chain Polyoxymethylene Polycarboxylates," now United States Letters Patent No. 3,219,630.

This invention relates to polyacetals and, more particularly, to high molecular weight polymers of formaldehyde or of its trimer, trioxane. The invention provides a new class of thermoplastic, high molecular weight, branched chain polyoxymethylene polycarboxylates which possess a unique combination of high temperature stability and inertness to chemicals, properties which should qualify these new thermoplastic polymers for general use as engineering plastics.

During the exhaustive investigation into the polymerization of formaldehyde (or trioxane) which preceded the filing of my copending application Ser. No. 133,783, it was found that formaldehyde (or trioxane) could be polymerized in an alkylene dicarboxylate reaction medium in which there was dissolved or suspended a catalytic amount of a formaldehyde polymerization initiator to form a partially acylated polyoxymethylene polyol which, in turn, could be completely acylated in situ without removal from the reaction medium merely by heating the system. Further investigation revealed that the use of an alkylene dicarboxylate as the reaction medium appeared to influence the molecular configuration of the resultant polymer by introducing branched (or pendant) chains at one or more points in the primary polymer chain, for it was noted that when substantially anhydrous monomeric formaldehyde was polymerized by contacting the monomer with a reaction medium comprising methylene diacetate in which there was dissolved a formaldehyde polymerization initiator, and the resultant partially acetylated polymer was then "capped" by adding acetic anhydride to the reaction medium, thereby forming a polyoxymethylene polyacetate, viscometric determination of the molecular weight of this polymer invariably yielded values which were higher than the molecular weight values which were computed from the infrared absorption in the carbonyl region, assuming the polymer to be linear and hence an α,ω-diacetate. Thus, if there were more than two acetate groups per molecule in these polyoxymethylene polycarboxylates, then the molecular weight which is computed from infrared absorption spectrum should be lower than the viscosimetrically determined molecular weight for the same polymer. Comparable molecular weight determinations on a commercially available polyoxymethylene diacetate of known structure, using both the viscosimetric and infrared techniques, show no differences in molecular weight by either technique, thereby confirming that this commercially available product is linear and contains only two acetate groups per molecule. On the basis of the foregoing data, I concluded that the homopolymeric polyoxymethylene polycarboxylates produced in accordance with this process contained from 1 to 4 (and perhaps even as high as 6) branches per polymer molecule.

Subsequent investigations of the rheological properties for shearing stress and shearing rate of these new polyoxymethylene polycarboxylates have shown in each instance that these polymers are characterized by a relatively higher apparent viscosity at low shear rates and a relatively lower apparent viscosity at high shear rates than those of a linear α,ω-polyoxymethylene dicarboxylate having approximately the same average molecular weight, which evidence further supports the conclusion that the new polyoxymethylene polycarboxylates of the invention are branched chain polymers containing from 1 to about 4 branched (or pendant) chains on each primary polymer chain.

Based on these discoveries, the invention provides a new class of normally solid, thermoplastic, high molecular weight, branched chain, polyoxymethylene polycarboxylates which are characterized by a Sidi Number (as that term is defined herein) not less than 1.5 when such Sidi Number is computed in accordance with the formula $$S_N = \frac{\overline{M}_V}{\overline{M}_{IR}}$$

where $S_N$=Sidi Number
$\overline{M}_V$=Apparent molecular weight of the polymer as determined by viscosimetric techniques; and
$\overline{M}_{IR}$=Calculated molecular weight of the polymer as computed from the intensity of the carbonyl absorption band of the infrared spectrum of the polymer, assuming for the purpose of such calculation that the intensity of such carbonyl absorption band is due to the presence of two carboxylate groups per molecule.

To prepare the new branched chain polyoxymethylene polycarboxylates of the invention, gaseous, substantially anhydrous, monomeric formaldehyde (or, alternatively, trioxane) is polymerized by passing the monomer into a reaction medium comprising an alkylene dicarboxylate in which there is dissolved or suspended a catalytic amount of a formaldehyde polymerization initiator, thereby forming a suspension of a partially acylated, high molecular weight, branched chain polyoxymethylene polyol as an intermediate product. By merely increasing the temperature of the reaction medium, the remaining uncapped hydroxy groups of the intermediate polymer undergo esterification to form the corresponding high molecular weight, branched chain polyoxymethylene polycarboxylate.

The alkylene dicarboxylates employed in the reaction media used to produce the new branched chain polyoxymethylene polycarboxylates of the invention are structurally characterized by the formula

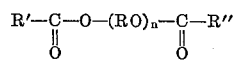

in which R is a divalent substituent selected from the group consisting of —CH$_2$— or —CH(CH$_3$)—, R' and R" each represent substituents selected from the group consisting of alkyl groups containing from 1 to 18 carbon atoms, cycloalkyl groups, and aryl groups and $n$ is an integer from 1 to 3. By way of illustration, the substituents R' and R" may include methyl, ethyl, propyl, hexyl, octyl, 2-ethylhexyl, decyl, dodecyl, hexadecyl, heptadecyl, cyclopentyl, phenyl, chlorophenyl, and hydroxyphenyl groups. Excellent results have been obtained using those alkylene dicarboxylates in the reaction medium in which R represents a methylene group (—CH$_2$—) and R' and R" each represent an alkyl group containing from 1 to 3 carbon atoms, which alkylene dicarboxylates include methylene diacetate, methylene dipropionate, methylene dibutyrate, methylene acetate propionate, the low molecular weight polymeric analogs ($n$=2 or 3) of these dicarboxylates, and mixtures thereof. Branched chain polyoxymethylene polyacetates having a Sidi Number in the range from 1.5 to about 4.5 and excellent physical properties have been consistently produced in methylene diacetate or in mixtures of from 50 to 90 percent by weight of methylene diacetate and from 10 to 50 percent by weight of its dimer and trimer analogs.

The use of these alkylene dicarboxylates as the reaction medium in the process by which the new branched chain polyoxymethylene polycarboxylates of the invention are prepared permits the polymerization reaction to occur under mild temperatures, at which polymerization temperatures these reaction media are liquid, inert to formaldehyde and to the polymerization initiator, and do not dissolve the partially acylated polyoxymethylene polyol formed; at the elevated temperatures at which the in situ stabilization is carried out the alkylene dicarboxylates readily dissolve the high molecular weight partially acylated polyoxymethylene polyol to form the branched chain polyoxymethylene polycarboxylates of the invention. The amount of the alkylene dicarboxylate present during the polymerization is not critical but may be within the range of approximately 1 part to 1000 parts by weight per part by weight of monomeric formaldehyde. In most cases, approximately 1 part to 100 parts by weight of the alkylene dicarboxylate should be employed for each part by weight of monomer.

Although the polymerization of formaldehyde to produce the branched chain polyoxymethylene polycarboxylates of the invention may be carried out in the presence or absence of a formaldehyde polymerization initiator, best results have been obtained by conducting the polymerization reaction in the presence of a catalytic amount of a formaldehyde polymerization initiator, which generally is in the range from about 0.00001 to about 0.05 part by weight (and preferably from about 0.0001 to about 0.005 part by weight) per part by weight of monomer. Any of the well-known formaldehyde polymerization initiators may be used in the polymerization reaction. These include aliphatic amines, aromatic amines, hydroxypolyamines, metal organic compounds, phosphines, arsines, stilbenes, metal chelates, alkali metal and alkaline earth metal hydroxides, oxides, peroxides, and the like. Among the preferred formaldehyde polymerization initiators are aliphatic amines, polyamines, metal chelates and metal salts, such as tri-n-butylamine, tetraalkyl-alkylene diamines, copper soaps, and metal acetylacetonates.

The polymerization of formaldehyde to the new high molecular weight, branched chain polyoxymethylene polycarboxylates of the invention may be carried out in any convenient manner. For example, gaseous, substantially anhydrous, monomeric formaldehyde may be introduced into a reactor containing the alkylene dicarboxylate and the formaldehyde polymerization initiator. Alternatively, monomeric formaldehyde may be introduced into a reactor containing the alkylene dicarboxylate, while at the same time the initiator is added at such rate that the temperature of the reaction mixture is maintained within the desired range. Moreover, the polymerization of formaldehyde to produce the new polymers of the invention may be carried out as either a batchwise process or as a continuous process.

The anhydrous monomeric formaldehyde is ordinarily introduced into the reactor through a gas inlet tube opening above the surface of the alkylene dicarboxylate reaction medium so as to avoid plugging due to formation of polymer within the tube. The reaction mixture is stirred vigorously throughout the formaldehyde addition and polymerization step. In general, the polymerization reaction is generally carried out at a temperature between about −100° C. and about 80° C. and, preferably, in the range between −30° C. and 40° C. While superatmospheric and subatmospheric pressures can be employed, in most instances the reaction occurs under atmospheric pressures.

The formation of the tough, high molecular weight, branched chain polyoxymethylene polycarboxylates should be carried out under non-oxidizing conditions. A convenient way of obtaining such conditions involves sweeping the reactor with a dry, inert gas, such as nitrogen, and then polymerizing the monomeric formaldehyde under a blanket of the inert gas. In addition, an antioxidant may be present during the polymerization and/or may be added to the product to preclude oxidation. Among the antioxidants that are useful for this purpose are phenothiazine, 2-mercaptobenzimidazole, diphenylamine, phenyl-α-naphthylamine, bis-(β-naphthylamino) p-phenylene diamine, 4,4′ - butylidene - bis-(3-methyl-6-tertiary butylphenol), and 5-ethyl-10,10-diphenyl-phenazasiline. When used, the amount of antioxidant generally will be in the range from about 0.01 to 1 percent by weight, based on the weight of formaldehyde introduced into the reaction medium.

To control the molecular weight and molecular weight distribution of the polymer, it may be desirable to employ a small amount of a chain transfer agent in the reaction medium, which chain transfer agent may be added to the reaction medium before or during the polymerization reaction. Suitable chain transfer agents include water; aliphatic alcohols (such as methanol and cyclohexanol); aliphatic acids and acid anhydrides (such as formic acid, acetic acid, butyric acid, acetic anhydride, and propionic anhydride); aromatic acids (such as benzoic acid and toluic acid); esters (such as methyl acetate, methyl propionate, ethyl formate, ethyl acetate); saturated aliphatic dicarboxylic acids and their lower alkyl esters (such as oxalic acid, diethyl oxalate, and mixtures thereof); or various mixtures of these chain transfer agents.

The polymerization reaction occurs quite rapidly and is generally considered to be complete as soon as all of the monomeric formaldehyde has been added to the reaction medium, which may be maintained at the polymerization temperature for an additional period ranging from several minutes to an hour or more.

At the end of the polymerization reaction, the reaction mixture comprises a suspension of partially esterified, high molecular weight, branched chain polyoxymethylene polyol in the alkylene dicarboxylate from which the intermediate polymer may be isolated. Because of the uniqueness of alkylene dicarboxylates as the reaction medium, the esterification of the polymer may be completed merely by heating the reaction mixture at a temperature in the range from about 140° C. to about 200° C. (and preferably in the range from 160° C. to 170° C.) in the presence of a small amount of an alkaline esterification catalyst, during which heating the esterified polymer dissolves in the hot alkylene dicarboxylate.

Many types of alkaline esterification catalysts may be used in the in situ esterification, including alkali metal salts of acids having dissociation constants, at 25° C., of less than $1.8 \times 10^{-4}$. These catalysts include the sodium, potassium, lithium, rubidium, and cesium salts of a wide variety of organic and inorganic acids, such as sodium formate, sodium acetate, sodium propionate, sodium laurate, sodium stearate, sodium benzoate, sodium salicylate, sodium carbonate, disodium phosphate, potassium acetate, potassium benzoate, potassium carbonate, lithium acetate, lithium salicylate, and lithium carbonate, to cite but a few. The amount of alkaline esterification catalyst which may be conveniently used is ordinarily in the range of 0.001 to 1 percent by weight, and preferably from 0.01 to 0.1 percent by weight, based on the weight of the alkylene dicarboxylate.

Optimum yields of the branched chain polyoxymethylene polycarboxylates of the invention are obtained when the esterification medium also contains from about 0.1 to about 30 percent by weight of an anhydride of a saturated monocarboxylic acid, based on the weight of the alkylene dicarboxylate. These anhydrides include those of alkanoic acids having from 1 to 10 carbon atoms, cycloaliphtic acids, and aromatic acids, of which acetic acid, propionic acid, butyric acid, decanoic acid, cyclohexane carboxylic acid, benzoic acid, and mixtures of these acids are representative examples. When an acid anhydride is employed to facilitate the esterification (or "capping") reaction, it should be substantially free of acid to prevent any losses in yield which may result from degradation of the polymer. If desired, small amounts of a ketene may be added periodically to react with the acid formed as a by-product of the esterification, thereby forming additional amounts of acid anhydride.

Upon completion of the esterification reaction, the solution of branched chain polyoxymethylene polycarboxylate in the alkylene dicarboxylate should be cooled slowly and at a uniform rate from the temperature at which the esterification was carried out to a temperature below that at which solid polymer first appears so that the polymer precipitates or crystallizes in the form of powder or small crystals. In general, this cooling is preferably carried out at the rate of approximately 5° C. to 15° C. (preferably 7° C. to 10° C.) per hour. When the polymer solution is cooled more rapidly, the crystals of polyoxymethylene polycarboxylate tend to form aggregates and to cake on the walls of the reactor. At temperatures below 120° C., the rate at which the reaction mixture is cooled is not critical, however, and the cooling to ambient temperature can be carried out at a faster rate without affecting the physical characteristics of the product. The solid polyoxymethylene polycarboxylate which precipitates upon cooling the reaction mixture may be separated and recovered by filtration or any standard work-up.

In most instances, the polymer product recovered from the esterification reaction should be washed and dried as thoroughly as possible or otherwise treated to remove any material or by-product which might cause degradation of the polymer. For most purposes, this purification may be accomplished conveniently by washing the polymer with water or organic solvents, such as ketones, ethers, and hydrocarbons, and then drying the washed polymer. For example, the filter cake obtained by separating the polymer from the reaction medium may be washed first with acetone, then with water, and then finally with acetone.

The branched chain polyoxymethylene polycarboxylates of the invention are normally solid, high molecular weight thermoplastic polymers which are characterized by (i) a melting point in the range from about 150° C. to about 200° C., (ii) a viscosimetrically determined apparent molecular weight in the range from about 10,000 to about 300,000, and (iii) a Sidi Number not less than 1.5 when computed in accordance with the formula $S_N = \overline{M}_V / \overline{M}_{IR}$, where $S_N$ represents the Side Number, $\overline{M}_V$ represents the viscosimetrically determined apparent molecular weight of the polymer, and $\overline{M}_{IR}$ represents the IR-spectrophotometrically determined molecular weight of the polymer calculated from the intensity of the carbonyl absorption band of the infrared absorption spectrum of the polymer and assuming for the purpose of such calculation that the intensity of such carbonyl absorption band is due to the presence of two acetate groups per molecule. Moreover, the rheological properties for shearing stress and shearing rate of these polyoxymethylene polycarboxylates are characterized by a relatively higher apparent viscosity at low shear rates and a relatively lower apparent viscosity at high shear rates than those of a linear $\alpha,\omega$-polyoxymethylene dicarboxylate (i.e., same end-group) having approximately the same average molecular weight.

To compute the Sidi Number, which is an indication of the extent of branching in the polymer, the molecular weight of the polymer must be determined by viscosimetric techniques and then by end-group analysis using the infrared method. Determination of the apparent molecular weight ($\overline{M}_V$) of the polymer by the viscosimetric technique may be conducted (a) by osmometry in phenol solutions at 90° C., preferably using the method described by Koch and Lindvig, Journal of Applied Polymer Science, 1, 164 (1959), or (b) by osmometry in dimethylformamide solutions at 150° C. using 0.5 g. of polymer per 100 ml. of dimethylformamide and for which the constants for the equation $\eta = KM^\alpha$ have been found to be $K = 9.72 \times 10^{-4}$ and $\alpha = 0.626$.

Determination of the calculated molecular weight ($\overline{M}_{IR}$) of the polymer requires analysis of its infrared spectrum. The infrared spectrum of a pressed film of polyoxymethylene diacetate shows carbonyl absorption at 5.69μ. A film of suitable thickness may be prepared by cold pressing 20 mg. of the powdered polymer in a die used to prepare 0.5 inch KBr pellets, while films of extruded pellets can be prepared at 180° C. to 200° C. by pressing between microscope cover glasses on a hot stage. Because of the difficulty of precisely duplicating the thickness of pressed films, however, the absorption of the carbonyl band may be expressed as a ratio of the —OCH$_2$— band at 2.54μ. As used herein, the values for $\overline{M}_{IR}$ for polyoxymethylene polyacetates have been calculated from the equation $$\overline{M}_{IR} = \frac{5.18 \times 10^4}{R}$$

where
$\overline{M}_{IR}$ = Calculated molecular weight of the polymer; and
$R$ = The ratio of the intensity of the carbonyl absorption band (at 5.69μ) to the intensity of the oxymethylene absorption band (at 2.54μ) in the infrared spectrum of the polymer, which relationship has been empirically determined by infrared analyses of samples of linear $\alpha,\omega$-polyoxymethylene diacetates of known structures, and has been further verified by chemical analyses of these samples of known structure. Since this relationship is based on the presence of only two acetate groups per molecule, the calculation of $\overline{M}_{IR}$ of the polyoxymethylene polyacetates for the purpose of computing the Sidi Number is also based on the assumption that the polymer contains only two acetate groups per molecule. Because the branched chain polyoxymethylene polyacetates of the invention contain at least 3 acetate groups per molecule, the value for $\overline{M}_{IR}$ will always be lower than the value for $\overline{M}_V$ for a branched chain polyoxymethylene polyacetate, while the values for $\overline{M}_{IR}$ and $\overline{M}_V$ will be substantially in agreement in a linear $\alpha,\omega$-polyoxymethylene diacetate.

Table I sets forth the values for $\overline{M}_V$, $\overline{M}_{IR}$ and the Sidi Number for thirteen different acetate-capped high molecular weight polymers of formaldehyde, the first ten of which (Polymers A to J) are branched chain polyoxymethylene polyacetates produced by homopolymerizing formaldehyde in methylene diacetate, while the last three polymer samples (Polymers K to M) were linear $\alpha,\omega$-polyoxymethylene diacetates in which the presence of only 2 acetate groups per molecule was further verified by chemical analysis.

TABLE I

| Polymer | Molecular Weight | | Sidi Number |
|---|---|---|---|
| | $\overline{M}_V$ | $\overline{M}_{IR}$ | |
| A | 43,000 | 10,600 | 4.06 |
| B | 49,000 | 13,100 | 3.74 |
| C | 40,100 | 11,200 | 3.58 |
| D | 49,000 | 13,100 | 3.74 |
| E | 48,400 | 17,500 | 2.77 |
| F | 59,300 | 23,300 | 2.54 |
| G | 36,500 | 15,600 | 2.34 |
| H | 26,000 | 12,400 | 2.10 |
| I | 38,600 | 18,900 | 2.04 |
| J | 33,200 | 18,700 | 1.77 |
| K | 26,700 | 25,500 | 1.05 |
| L | 30,500 | 31,000 | 0.99 |
| M | 32,200 | 38,900 | 0.83 |

Comparison of the rheological properties of Polymers A to J (Branched chain polyoxymethylene polyacetates) with those of Polymers K to M (linear α,ω-polyoxymethylene diacetates), particularly with respect to shearing stress and shearing rate, has shown that the branched chain polyoxymethylene polyacetates of the invention are characterized by relatively higher apparent viscosities at low shear rates and relatively lower apparent viscosities at high shear rates than those of linear α,ω-polyoxymethylene diacetates having approximately the same average molecular weight. Taken in conjunction with the differences in the Sidi Numbers, evidence of these differences in rheological properties conclusively demonstrates that the new polyoxymethylene polyacetates of the invention are branched chain polymers containing from 1 to about 4 (or even as high as 6) branches or pendant chains for each primary or main chain.

The polyoxymethylene polycarboxylates of the invention, of which the polyoxymethylene polyacetates are representative, possess a unique combination of physical and chemical properties which permits these polymers to be readily fabricated by injection molding or extrusion techniques. Whether a thermoplastic polymer is useful for commercial applications is dependent upon many factors, such as its average molecular weight, molecular weight distribution, apparent viscosity, and thermal stability. While any one of these properties may be taken as a rough indication of the molding characteristics of the polymer, experience has indicated that it is necessary to measure all of these properties or to actually process the polymer in molding apparatus in order to evaluate it as a commercial resin. More recently, however, it has been possible to obtain a summation of these effects by determining the melt viscosity of the polymer under typical processing conditions of temperature, rate of shear, and shearing force. While a number of instruments are capable of furnishing useful melt viscosity data, the Brabender Plasti-corder (C. W. Brabender Instruments, Inc.) is particularly valuable for this purpose because it provides flow data obtained under dynamic test conditions and can therefore closely simulate behavior typical of that expected during processing. Moreover, the Plasti-corder provides information on the thermal stability of the polymer under conditions which simulate those encountered during most commercial processing techniques. Essentially, the Brabender Plasti-corder is a laboratory Banbury mixer with a variable speed dynamometer drive that records continuously changes in polymer melt viscosity at a given temperature. As a polymeric material is plasticized by heating and by the working of the rotor blades, a graph is produced continuously which records the torque (in meter grams) on the motor housing (a measure of the power involved in fluxing the resin) as a function of shear rate and temperature.

The melt flow characteristics of the branched chain polyoxymethylene polycarboxylates of the invention may be studied by the following procedure: To 45 g. of powdered polymer are added a ternary stabilizer composition consisting of 0.675 g. of a terpolymer of approximately 38% polycaprolactam/35% polyhexamethylene adipamide/27% polyhexamethylene sebacamide, 0.135 g. of 4,4′-butylidene-bis-(3-methyl-6-tert. butylphenol), and 0.045 g. of dilauryl 3,3′-thiodipropionate. This mixture of polymer and stabilizer components is introduced rapidly into the chamber of the Brabender Plasti-corder, the chamber being maintained at 220° C. during the addition of the mixture and throughout the melt viscosity test. The material is fluxed for 7 minutes at a rotor speed of 63 r.p.m. and then for 30-second intervals at speeds of 50 r.p.m., 40 r.p.m., 30 r.p.m., and 20 r.p.m., respectively. The rotor speed is then returned to 63 r.p.m. for 30 seconds. After a 30-second period at 70 r.p.m., the rotor speed is increased by 10 r.p.m. increments at 30-second intervals until it has reached 150 r.p.m. The test material is then fluxed at 63 r.p.m. for 15 minutes. From the graph that is produced during the 30-minute test period various measurements may be obtained which, when combined, yield a profile of the polymer from which its suitability for use in injection molding and extrusion apparatus can be determined. Among these measurements are the following:

1. DEGRADATION SLOPE

The Degradation Slope is the slope of the line obtained by plotting the logarithms of the torque readings taken during the initial seven minute period of the cycle against time. Since branched chain polyoxymethylene polycarboxylates having high molecular weights generally degrade more rapidly when fluxed at high temperatures than do those having lower molecular weights, the molecular weight of the polymer can be estimated from its Degradation Slope.

2. SHEAR SLOPE

This slope, which is a measure of the sensitivity of the polymer to shear, can be used to provide qualitative data on the molecular weight distribution of the polymer, with larger values indicating greater uniformity in chain length at the same average molecular weight. For branched chain polyoxymethylene polycarboxylates, it has been found that the optimum Shear Slope for the polymer having an average molecular weight (viscosimetric) of approximately 30,000 is in the range of 4 to 7, whereas for a polymer having an average molecular weight of approximately 50,000 it is in the range of 10 to 20. The Shear Slope is the slope of the line obtained by plotting against time the logarithms of the torque measurements taken during the period in which the rate of rotation of the rotors was varied from 63 r.p.m. to 20 r.p.m.

3. ROTOR SPEED AT WHICH TORQUE REACHES A MAXIMUM VALUE

When the rate of rotation of the rotors is increased from 63 r.p.m. to 150 r.p.m., the torque of stable polymers increases at a regular rate. When materials that are sensitive to shear are used in the Brabender Plasti-corder test, degradation takes place as the rate of rotation is increased. There is a resulting decrease in the torque of the molten polymer which may equal or surpass the rate at which the torque is increased as the result of increasing shear force. The rotor speed at which the torque reaches a maximum value is recorded. Branched chain polyoxymethylene polycarboxylates which have satisfactory stability when subjected to increasing shear force and, accordingly, have good extrusion properties do not ordinarily reach a maximum torque value at a rate of rotation below 80 r.p.m.

4. PERCENT LOSS IN TORQUE ON SHEAR

This value is a measure of the sensitivity of the polymer to degradation caused by shear. It is calculated from the difference between the torque of the molten resin at 63 r.p.m. after the initial seven minute fluxing period and that of the resin at 63 r.p.m. after the rotor speed has been varied from 63 r.p.m. to 20 r.p.m. and to 150 r.p.m. as hereinbefore described.

5. FINAL TORQUE

The final portion of the graph indicates the thermal stability of the molten resin under dynamic conditions. In a stable polymer there will be little or no change in torque during the last 15 minutes of the test. The torque of the molten resin at the conclusion of the test should be in the range of 200 to 800 meter grams and preferably in the range of 350 to 600 meter grams if the resin is to be fabricated in injection molding or extrusion equipment.

The following examples are illustrative of the preparation of the new branched chain polyoxymethylene polycarboxylates of the invention. In each of these examples where indicated, the thermal stability of the polymers was determined by measuring the weight loss of a one gram sample of the polymer when heated at 222° C. for one hour. All of the branched chain polyoxymethylene polycarboxylates of the invention possess a thermal degradation rate at this temperature of less than 10 percent by weight per hour.

*Example I*

Anhydrous monomeric formaldehyde was prepared by adding 100 grams of α-polyoxymethylene over a period of 65 minutes to a stirred solution of 0.5 gram of phosphoric acid in 500 grams of the diethyl ether of diethylene glycol at 140°–160° C. The formaldehyde vapors from this pyrolysis were passed through two traps, the first of which was maintained at 0° C. and the second at −20° C. The resulting purified anhydrous monomeric formaldehyde was introduced along with a stream of dry nitrogen into a reactor that contained 560 grams of methylene diacetate, 0.1 gram of 4,4′-butylidene bis (3-methyl-6-tert. butylphenol), and 0.1 gram of tri-n-butylamine. The reaction mixture was stirred and maintained at a temperature between −17.5° C. and −20° C. during the addition of the formaldehyde. When all of the formaldehyde had been added, 0.4 gram of anhydrous sodium acetate and 9.5 grams of acetic anhydride were added to the reaction mixture. This mixture was then stirred and heated gradually to its reflux temperature (166°–171° C.) and maintained at that temperature for one hour. At the end of this period, the solution of polyoxymethylene polyacetate in methylene diacetate was cooled to 125° C. at the rate of approximately 7°–8° C. per hour and then more rapidly to ambient temperature. Following filtration, the product was washed with 500 ml. of acetone, with two 500 ml. portions of water, and finally with an additional two 500 ml. portions of acetone, the second of which contained 0.1 gram of 4,4′-butylidene bis (3-methyl-6-tert. butylphenol). After drying under vacuum at 65° C. to constant weight, there was obtained 66 grams of polyoxymethylene polyacetate which was characterized by the following properties:

Molecular weight (viscometric method) _____ 30,000
Thermal degradation rate at 222° C.
    percent/hour__ 0.13
Brabender melt viscosity characteristics:
    Degradation slope _____ 3.3
    Shear slope _____ 6.5
    Rotor speed at which torque reached a maximum value _____r.p.m__ 120
    Percent loss of torque due to shear _____ 52
    Final torque _____meter grams__ 380

Analysis of this data indicates that this polymer has excellent melt flow characteristics and that it has good resistance to thermal degradation and to shear degradation.

*Example II*

Anhydrous monomeric formaldehyde obtained by the pyrolysis of 250 grams of α-polyoxymethylene was passed through the series of traps described in Example I and into a reactor which contained 1545 grams of methylene diacetate, 0.5 gram of tri-n-butylamine, and 0.25 gram of 4,4′-butylidene-bis-(3-methyl-6-tert. butylphenol). The reaction mixture was stirred and maintained at a temperature between 25° C. and 30° C. during the addition of the formaldehyde. When all of the formaldehyde had been added, 1.25 grams of anhydrous sodium acetate was added. The mixture was stirred and heated gradually to 162°–164° C., maintained at that temperature for one hour, and then cooled slowly to ambient temperature. Following filtration, the product was washed and dried by the procedure described in Example I, yielding 64 grams of polyoxymethylene polyacetate which was characterized by the following properties:

Molecular weight (viscometric method) _____ 41,500
Molecular weight (infrared method) _____ 11,400
Thermal degradation rate at 222° C.
    percent/hour__ 8.4
Brabender melt viscosity characteristics:
    Degradation slope _____ 1.33
    Shear slope _____ 4.4
    Rotor speed at which torque reached a maximum value _____r.p.m__ 120
    Percent loss of torque due to shear _____ 31.2
    Final torque _____meter grams__ 400

*Example III*

Anhydrous monomeric formaldehyde was prepared by adding 100 grams of α-polyoxymethylene over a period of 60 minutes to a stirred solution of 0.5 gram of phosphoric acid in 500 grams of the diethyl ether of diethylene glycol at 140°–160° C. The formaldehyde vapors from this pyrolysis were passed through two traps, the first of which was maintained at 0° C. and the second at −20° C. The resulting purified anhydrous monomeric formaldehyde was introduced along with a stream of dry nitrogen into a reactor that contained 560 grams of methylene diacetate, 0.1 gram of 4,4′-butylidene-bis-(3-methyl-6-tert. butylphenol), and 0.1 gram of iron octanoate. The reaction mixture was stirred and maintained at a temperature between 8° C. and 19° C. during the addition of the formaldehyde. When all of the formaldehyde had been added, 0.4 gram of anhydrous sodium acetate and 9.5 grams of acetic anhydride were added to the reaction mixture. This mixture was then stirred and heated gradually to its reflux temperature (166°–170° C.) and maintained at that temperature for one hour. The resulting solution was cooled to 125° C. at the rate of approximately 7°–9° C. per hour and then more rapidly to ambient temperature. Following filtration the product was washed and dried by the procedure described in Example I, yielding 54 grams of polyoxymethylene polyacetate which had an average molecular weight (viscosimetric method) of 78,000.

*Example IV*

Anhydrous monomeric formaldehyde was prepared by adding 100 grams of α-polyoxymethylene over a period of 60 minutes to a stirred solution of 2 grams of phosphoric acid in 700 grams of the diethyl ether of diethylene glycol at 140°–160° C. The formaldehyde vapors from this pyrolysis were passed through a trap at 0° C. and into a reactor that contained 700 grams of methylene diacetate, 0.1 gram of 4,4′-butylidene-bis-(3-methyl-6-tert. butylphenol), 0.1 gram of iron octanoate, and 3 grams of diethyl oxalate. The reaction mixture was stirred and maintained at a temperature between 25° and 30° C. during the addition of the formaldehyde. When all of the formaldehyde had been added, 0.4 gram of anhydrous sodium acetate and 10 grams of acetic acid were added to the reaction mixture. This mixture was then stirred and heated gradually to its reflux temperature (160°–165° C.) and maintained at that temperature for one hour. At the end of this period, the solution was cooled to ambient temperature at the rate of approximately 8°–9° C. per hour. Following filtration, the product was washed and dried by the procedure described in Example I. There was obtained 57.5 grams of polyoxymethylene polyacetate which was characterized by the following properties:

Molecular weight (viscometric method) _____ 35,000
Brabender melt viscosity characteristics:
    Degradation slope _____ 5.3
    Shear slope _____ 4.5
    Rotor speed at which torque reached a maximum value _____r.p.m__ 140
    Percent loss of torque due to shear _____ 35
    Final torque _____meter grams__ 420

Example V

Anhydrous monomeric formaldehyde was prepared by adding 24 pounds of α-polyoxymethylene over an 8-hour period to a stirred solution of 0.5 pound of phosphoric acid in 100 pounds of the diethyl ether of diethylene glycol at 130°–149° C. The formaldehyde vapors from this pyrolysis were passed through the series of traps described in Example I and into a reactor that contained 200 pounds of methylene diacetate, 0.4 pound of a 2.5% solution of ferric acetylacetonate in toluene, and 1 pound of diethyl oxalate containing 0.07% of oxalic acid. The reaction mixture was stirred and maintained at a temperature between 17° C. and 22° C. during the addition of the formaldehyde. There was obtained 217.2 pounds of a suspension of 14.2 pounds of partially acetylated polyoxymethylene polyol in methylene diacetate. To this suspension was added 10.8 pounds of acetic anhydride and 0.11 pound of anhydrous sodium acetate. This mixture was stirred and heated gradually to 166° C., maintained at that temperature for one hour, and then slowly cooled to ambient temperature. Following filtration, the product was washed with 100 pounds of acetone, with two 60 pound portions of cold water, with 200 pounds of hot water, and finally with 100 pounds of acetone. After drying under vacuum at 60° C., there was obtained 14.2 pounds of polyoxymethylene polyacetate which had the following properties:

| | |
|---|---|
| Molecular weight (viscometric method) | 42,900 |
| Thermal degradation rate at 222° C. percent/hour | 7.6 |
| Brabender melt viscosity characteristics: | |
|   Degradation slope | 4.0 |
|   Shear slope | 8.0 |
|   Rotor speed at which torque reached a maximum value r.p.m. | 100 |
|   Percent loss of torque due to shear | 60.8 |
|   Final torque meter grams | 350 |

Example VI

Anhydrous monomeric formaldehyde was prepared by adding 24 pounds of α-polyoxymethylene over an 8 hour period to a stirred solution of 0.5 pound of phosphoric acid in 100 pounds of the diethyl ether of diethylene glycol at 143°–153° C. The formaldehyde vapors from this pyrolysis were passed through the series of traps described in Example I and into a reactor which contained 200 pounds of methylene diacetate, 0.4 pound of a 2.5% solution of ferric acetylacetonate in toluene, and 1 pound of diethyl oxalate containing 0.07% of oxalic acid. The reaction mixture was stirred and maintained at a temperature between 19.5° C. and 23° C. during the addition of the formaldehyde. There was obtained 218.2 pounds of a suspension of 15.6 pounds of partially acetylated polyoxymethylene polyol in methylene diacetate. To this suspension was added 10.9 pounds of acetic anhydride and 0.11 pound of anhydrous sodium acetate. This mixture was stirred and heated gradually to 166° C., maintained at that temperature for one hour, and then slowly cooled to ambient temperature. Following filtration, the product was washed and dried by the procedure described in Example 5. There was obtained 15.6 pounds of polyoxymethylene polyacetate which was characterized by the following properties:

| | |
|---|---|
| Molecular weight (viscometric method) | 31,700 |
| Thermal degradation rate at 222° C. percent/hour | 5.8 |
| Brabender melt viscosity characteristics: | |
|   Degradation slope | 2.66 |
|   Shear slope | 5.13 |
|   Rotor speed at which torque reached a maximum value r.p.m. | 130 |
|   Percent loss of torque due to shear | 32.7 |
|   Final torque meter grams | 470 |

Example VII

To 400 grams of freshly distilled ethylidene diacetate were added 0.1 gram of phenothiazine and 0.1 gram of ferric acetylacetonate. This mixture was then cooled to 20° C. To the reactor was added anhydrous monomeric formaldehyde obtained by heating at 120°–150° C. a suspension of 100 grams of α-polyoxymethylene in 360 grams of mineral oil and passing the resulting vapors through the series of traps described in Example I. The addition of formaldehyde took place over a period of 68 minutes during which time the reaction medium was maintained at a temperature between 21° C. and 25° C. Then after the addition of 0.4 gram of anhydrous sodium acetate, the mixture was stirred and heated at 160°–170° C. for one hour and cooled slowly to ambient temperature. The product was washed and dried by the procedure described in Example I, yielding 74 grams of polyoxymethylene polyacetate which had an average molecular weight (viscosimetric method) of 41,800. The mixture of products obtained on acid hydrolysis of the polymer was found to contain 0.10% by weight of acetaldehyde, which proved that the polymer contained a small proportion of polyfunctional units derived from the ethylidene diacetate that was used as the reaction medium.

Example VIII

Anhydrous monomeric formaldehyde was prepared by heating a suspension of 100 grams of α-polyoxymethylene in 400 ml. of mineral oil at 117°–150° C. The formaldehyde vapors from this pyrolysis were passed through a series of traps, the first of which was maintained at room temperature, the second at 0° C. and the third and fourth at −15° C. to −20° C. The resulting purified anhydrous monomeric formaldehyde was introduced along with a stream of dry nitrogen into a reactor that contained 400 ml. of methylene diacetate and 0.1 gram of phenothiazine. The reaction mixture was stirred vigorously during the addition of the formaldehyde which took place over a period of 80 minutes. The reaction medium was maintained at a temperature between −20° C. and −25° C. during the addition of the formaldehyde. When all of the formaldehyde had been added, 0.4 gram of anhydrous sodium acetate was added to the reaction mixture. This mixture was then stirred and heated gradually to 160°–170° C., maintained at that temperature for one hour, cooled slowly to ambient temperature, and filtered. The product was washed and dried by the procedure described in Example I. There was obtained 32.4 grams of polyoxymethylene polyacetate, which had an average molecular weight (viscosimetric method) of 30,000. The thermal degradation rate of the product at 222° C. was 1.57% per hour.

Example IX

A mixture of 560 grams of methylene diacetate, 0.1 gram of phenothiazine, and 0.1 gram of copper naphthenate was heated in a reactor to distill off 120 grams of methylene diacetate and then cooled to −25° C. To the reactor was then added anhydrous monomeric formaldehyde obtained by pyrolyzing 100 grams of α-polyoxymethylene and passing the resulting vapors through the series of traps described in Example VIII. The reaction mixture was stirred vigorously and maintained at −20° to −25° C. during the addition of formaldehyde which took place over a period of one hour. Then after the addition of 0.4 gram of anhydrous sodium benzoate, the reaction mixture was stirred and heated gradually to 160°–170° C., maintained at that temperature for 90 minutes, cooled slowly to ambient temperature, and filtered. The resulting product was washed and dried by the procedure described in Example I. There was obtained 36.7 grams of polyoxymethylene polyacetate that had an average molecular weight (viscosimetric method) of 21,000.

Example X

Anhydrous monomeric formaldehyde was prepared by heating a suspension of 100 grams of α-polyoxymethylene in 400 grams of mineral oil at 117°–115° C. The formaldehyde vapors from this pyrolysis were passed through a series of traps, the first of which was maintained at room temperature, the second at 0° C., and the third and fourth at −15° to −20° C. The anhydrous monomeric formaldehyde was introduced along with a stream of dry nitrogen into a reactor that contained 400 ml. of methylene diacetate, 0.1 gram of phenothiazine, and 0.4 gram of anhydrous potassium acetate. The reaction mixture was stirred vigorously and maintained at −20° to −25° C. during the addition of the formaldehyde. When all of the formaldehyde had been added, the reaction mixture was stirred and heated gradually to 160° to 170° C., maintained at that temperature for 30 minutes, cooled slowly to ambient temperature, and filtered. The product was washed and dried by the procedure described in Example I. There was obtained 28.3 grams of polyoxymethylene polyacetate, which had an average molecular weight of 21,000. The thermal degradation rate of the product at 222° C. was 1.15% per hour.

Example XI

A mixture of 560 grams of methylene diacetate, 0.1 gram of phenothiazine, and 0.1 gram of tri-n-butylamine was heated in a reactor to distill off 120 grams of methylene diacetate and then cooled to −25° C. To the reactor was then added anhydrous monomeric formaldehyde obtained by pyrolyzing 100 grams of α-polyoxymethylene and passing the resulting vapors through the series of traps described in Example VIII. The reaction mixture was stirred vigorously and maintained at −20° to −25° C. during the addition of the formaldehyde which took place over a period of one hour. Then after the addition of 0.4 gram of anhydrous sodium propionate, the reaction mixture was stirred and heated gradually to 160°–170° C., maintained at that temperature for 90 minutes, cooled to ambient temperature, and filtered. The product was washed and dried by the procedure described in Example I. There was obtained 50 grams of polyoxymethylene polyacetate that had an average molecular weight (viscosimetric method) of 25,000. The thermal degradation rate of the product at 222° C. was 4.45% per hour.

Example XII

A mixture of 524 grams of methylene dipropionate, and 0.1 gram of phenothiazine was heated in a reactor to distill off 105 grams of methylene dipropionate and then cooled to −25° C. To the reactor was then added anhydrous monomeric formaldehyde obtained by heating at 120°–150° C. a suspension of 100 grams of α-polyoxymethylene in 330 grams of mineral oil and passing the resulting vapors through the series of traps described in Example VIII. The addition of formaldehyde took place over a period of 80 minutes during which time the reaction medium was maintained at a temperature between −20° C. and −25° C. Then after the addition of 0.4 gram of anhydrous sodium acetate, the mixture was stirred and heated gradually to 160°–170° C., maintained at that temperature for one hour, cooled to ambient temperature, and filtered. The product was washed and dried by the procedure described in Example I. There was obtained 18.8 grams of polyoxymethylene polypropionate that had an average molecular weight (viscosimetric method) of 25,000.

Example XIII

Anhydrous monomeric formaldehyde was prepared by heating a suspension of 100 grams of α-polyoxymethylene in 400 ml. of paraffin oil at 121°–150° C. The formaldehyde vapors from the pyrolysis were passed through a series of traps, the first of which was maintained at room temperature, the second at 0° C., and the third and fourth at −15° to −20° C. The resulting anhydrous monomeric formaldehyde was introduced along with a stream of dry nitrogen into a reactor which contained 1500 ml. of anhydrous hexane, 0.1 gram of N,N,N′,N′-tetramethylethylene diamine, and 0.1 gram of phenothiazine. The reaction mixture was stirred vigorously and maintained at 25°–30° C. during the addition of the formaldehyde which took place over a period of 2 hours. As soon as all of the formaldehyde had been added, the reaction mixture was filtered. The resulting polyoxymethylene glycol after washing with cyclohexane and drying under vacuum at 65° C. to constant weight weighed 61.5 grams.

Ten grams of this polyoxymethylene glycol was added to a mixture of 150 grams of methylene diacetate and 0.1 gram of sodium acetate. The reaction mixture was stirred and heated at 150°–160° C. for 90 minutes, cooled slowly to ambient temperature, and filtered. The product was washed and dried by the procedure described in Example I. There was obtained 6.2 grams of polyoxymethylene polyacetate which had an average molecular weight of 54,000.

The branched chain polyoxymethylene polycarboxylates of the invention may be combined with plasticizers, fillers, solvents, antioxidants, heat and light stabilizers, and such other polymeric materials as vinyl resins and phenolformaldehyde resins to form compositions which are useful in many applications. These compositions can be converted by melt extrusion, injection molding, compression molding, and other fabrication techniques into films, fibers, and molded articles.

I claim:
1. A normally solid, high molecular weight, branched chain polyoxymethylene polycarboxylate which is characterized by a Sidi Number not less than 1.5 when computed in accordance with the formula $S_N = \overline{M}_V / \overline{M}_{IR}$, where $S_N$ represents the Sidi Number, $\overline{M}_V$ represents the viscosimetrically determined apparent molecular weight of the polymer, and $\overline{M}_{IR}$ represents the IR-spectrophotometrically determined molecular weight of the polymer calculated from the intensity of the carbonyl absorption band of the infrared absorption spectrum of the polymer and assuming for the purpose of such calculation that the intensity of such carbonyl absorption band is due to the presence of two carboxylate groups per molecule.

2. A normally solid, high molecular weight, branched chain polyoxymethylene polycarboxylate according to claim 1, in which the polymer is further characterized by (i) a melting point in the range from about 150° C. to about 200° C., and (ii) a viscosimetrically determined apparent molecular weight in the range from about 10,000 to about 300,000.

3. A normally solid, high molecular weight, branched chain polyoxymethylene polycarboxylate according to claim 1, in which the Sidi Number is in the range from 1.5 to 4.5.

4. A normally solid, high molecular weight, branched chain polyoxymethylene polyacetate which is characterized by a Sidi Number not less than 1.5 when computed in accordance with the formula $S_N = \overline{M}_V / \overline{M}_{IR}$, where $S_N$ represents the Sidi Number, $\overline{M}_V$ represents the viscosimetrically determined apparent molecular weight of the polymer, and $\overline{M}_{IR}$ represents the IR-spectrophotometrically determined molecular weight of the polymer calculated from the intensity of the carbonyl absorption band of the infrared absorption spectrum of the polymer and assuming for the purpose of such calculation that the intensity of such carbonyl absorption band is due to the presence of two acetate groups per molecule.

5. A normally solid, high molecular weight, branched chain polyoxymethylene polyacetate according to claim 4, in which the polymer is further characterized by (i) a melting point in excess of 170° C., and (ii) a viscosimetrically determined apparent molecular weight in the range from about 10,000 to about 300,000.

6. A normally solid, high molecular weight, branched chain polyoxymethylene polyacetate according to claim 4, in which the Sidi Number is in the range from 1.5 to 4.5.

7. A normally solid, high molecular weight, branched chain polyoxymethylene polyacetate according to claim 4, the rheological properties for shearing stress and shearing rate of which polyoxymethylenepolyacetate are characterized by a relatively higher apparent viscosity at low shear rates and a relatively lower apparent viscosity at high shear rates than those of a linear, $\alpha,\omega$-polyoxymethylene diacetate having approximately the same average molecular weight.

References Cited

UNITED STATES PATENTS

| | | | |
|---|---|---|---|
| 2,998,409 | 8/1961 | Nogare et al. | 260—67 |
| 3,226,366 | 12/1965 | Bezzi et al. | 260—67 |

OTHER REFERENCES

Kunststoffe: vol. 53, July 1963, pp. 11–21.

Translation from Kunstsoffe, vol. 53 (1963), pp. 424–436.

WILLIAM H. SHORT, *Primary Examiner.*

L. M. PHYNES, *Assistant Examiner.*